(12) United States Patent
Chen et al.

(10) Patent No.: US 12,504,947 B2
(45) Date of Patent: Dec. 23, 2025

(54) AUDIO DEVICE AND CONTROL METHOD THEREOF

(71) Applicant: Merry Electronics(Shenzhen) Co., Ltd., ShenZhen (CN)

(72) Inventors: Yu-Feng Chen, Taichung (TW); Chun-Yuan Lee, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 190 days.

(21) Appl. No.: 18/474,272

(22) Filed: Sep. 26, 2023

(65) Prior Publication Data
US 2025/0077170 A1  Mar. 6, 2025

(30) Foreign Application Priority Data

Aug. 31, 2023 (TW) .................................. 112132958

(51) Int. Cl.
*G06F 3/16* (2006.01)
(52) U.S. Cl.
CPC .................................. *G06F 3/165* (2013.01)

(58) Field of Classification Search
CPC ....................................................... G06F 3/165
See application file for complete search history.

(56) References Cited

U.S. PATENT DOCUMENTS

2012/0239828 A1*  9/2012  Lin .......................... G06F 3/162
710/16

FOREIGN PATENT DOCUMENTS

CN             107885480 A  *  4/2018  ............. G06F 3/162

* cited by examiner

*Primary Examiner* — Andrew Sniezek
(74) *Attorney, Agent, or Firm* — JCIPRNET

(57) ABSTRACT

An audio device and a control method thereof are provided. The audio device includes a first switch, a controller, and multiple audio switches. The first switch is turned on or cut off according to whether an audio jack is on a setting position. A first end of the first switch receives a bias voltage. The controller is coupled to the first switch, and generates control signals according to a turned-on or cut-off status of the first switch. The audio switches are respectively coupled between transmission paths of multiple audio signals. The audio switches are turned on or cut off according to the control signals or a voltage on a second end of the first switch.

16 Claims, 6 Drawing Sheets

AUDIO DEVICE AND CONTROL METHOD THEREOF

CROSS-REFERENCE TO RELATED APPLICATION

This application claims the priority benefit of Taiwan application serial no. 112132958, filed on Aug. 31, 2023. The entirety of the above-mentioned patent application is hereby incorporated by reference herein and made a part of this specification.

BACKGROUND

Technical Field

The disclosure relates to an audio device and a control method thereof, and more particularly, to an audio device that may reduce a phenomenon of pop noise and a control method thereof.

Description of Related Art

In the technical art nowadays, when wearing headphones with a side-tone function, your own voice may be heard through a feedback mechanism, whether you are talking or talking through a microphone, thereby solving discomfort of wearing the headphones. This type of audio device usually has an audio jack of 3.5 mm for installing a microphone or a wired audio source. However, when the microphone or a wired audio plug is plugged and unplugged while in use, pop noise may occur, resulting in a poor user experience.

In the technical art nowadays, firmware programs are often used to solve the above phenomenon of pop noise. For example, the firmware program may be used to delay a reception speed of an audio signal or to gradually increase a playback sound, so as to reduce an impact of pop noise. However, the above practice may still not effectively solve an issue of pop noise when the audio plug is slowly plugged into or unplugged from the audio device.

SUMMARY

The disclosure provides an audio device and a control method thereof, which may effectively reduce a phenomenon of pop noise generated when an audio jack is plugged and unplugged.

An audio device in the disclosure includes a first switch, a controller, and multiple audio switches. The first switch is turned on or cut off according to whether an audio jack is on a setting position. A first end of the first switch receives a bias voltage. The controller is coupled to the first switch, and generates a control signal according to a turned-on or cut-off status of the first switch. The audio switches are coupled to the controller and respectively coupled between transmission paths of multiple audio signals. The audio switches are turned on or cut off according to the control signal or a voltage on a second end of the first switch.

A control method of an audio device includes the following. A first end of a first switch receives a bias voltage, and the first switch is turned on or cut off according to whether an audio jack is on a setting position. A controller is provided to generate a control signal according to a turned-on or cut-off status of the first switch. Multiple audio switches are provided to be coupled between transmission paths of multiple audio signals respectively. The audio switches are turned on or cut off according to the control signal or a voltage on a second end of the first switch.

Based on the above, in the audio device of the disclosure, the first switch is set, and it is detected whether the plugged audio jack is plugged into a positioning point through the first switch. When the audio jack is plugged into the positioning point, the audio device turns on the audio switch, so that the audio signal may be transmitted to an inside of the audio device. On the other hand, when the audio jack leaves the positioning point, the audio device may cut off the audio switch and stop the transmission of the audio signal. In this way, the phenomenon of pop noise caused by plugging and unplugging of the audio jack in the audio device may be effectively reduced, thereby improving performance of the audio device.

DETAILED DESCRIPTION OF DISCLOSED EMBODIMENTS

Figure 1:
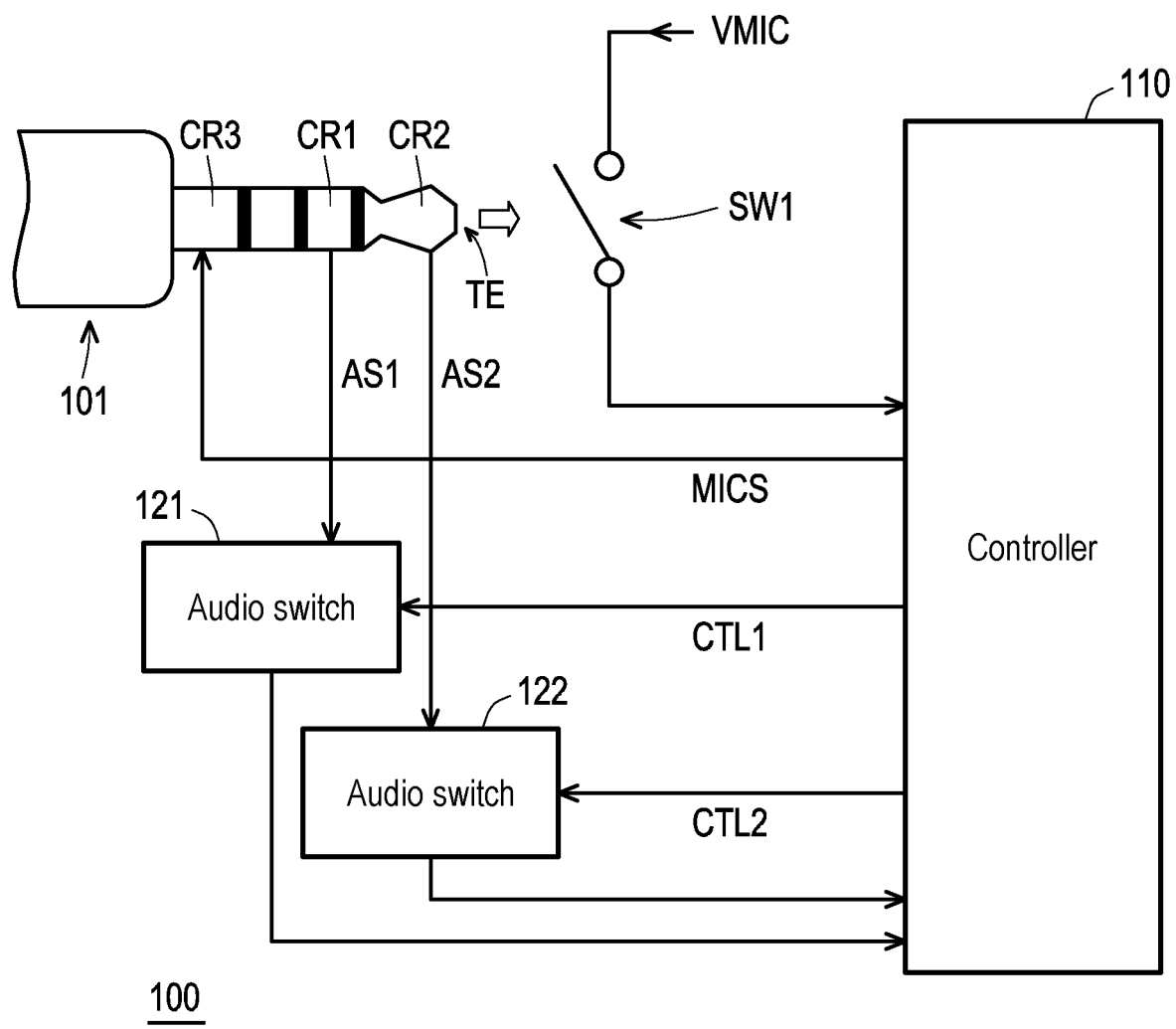
FIG. 1 is a schematic view of an audio device according to an embodiment of the disclosure.

Referring to FIG. 1, FIG. 1 is a schematic view of an audio device according to an embodiment of the disclosure. An audio device 100 includes a first switch SW1, a controller 110, and audio switches 121 and 122. A first end of the first switch SW1 receives a bias voltage VMIC, and a second end of the first switch SW1 is coupled to the controller 110. The audio switches 121 and 122 are coupled to the controller 110. After an audio jack 101 is plugged, the audio switches 121 and 122 are respectively coupled between transmission paths of multiple audio signals AS1 and AS2, and may be coupled to conductive structures CR1 and CR2 on the audio jack 101 respectively. The audio device 100 may provide the audio jack 101 for a plug-in operation. The first switch SW1 is set corresponding to a position when the audio jack 101 is plugged in. When the audio jack 101 is plugged into a setting position, it indicates that the plug-in operation of the audio jack 101 is completed. At this time, it indicates that a top TE of the audio jack 101 may resist the first switch SW1 and enable the first switch SW1 to be in a turned-on status. In contrast, when the audio jack 101 leaves the above setting position, the top TE of the audio jack 101 is separated from the first switch SW1. At this time, the first switch SW1 may be in a cut-off status.

In this embodiment, when the audio jack 101 is plugged into the setting position, the first switch SW1 may be turned on. At this time, the second end of the first switch SW1 may transmit the bias voltage VMIC to the controller 110. Correspondingly, when the controller 110 receives the bias voltage VMIC transmitted by the first switch SW1, it may be known that the audio jack 101 has been plugged into the setting position. In this way, the controller 110 may generate control signals CTL1 and CTL2 with a first voltage value, and transmit the control signals CTL1 and CTL2 to the audio switches 121 and 122 respectively. The audio switches 121 and 122 may be turned on according to the control signals CTL1 and CTL2 respectively.

When the audio switches 121 and 122 are turned on, the audio signals AS1 and AS2 transmitted on the conductive structures CR1 and CR2 may be transmitted to the controller 110 through the audio switches 121 and 122 respectively. In the embodiment of the disclosure, the audio switches 121 and 122 may also be transmitted to a speaker of the audio device 100. The audio signals AS1 and AS2 may be a first channel audio signal and a second channel audio signal respectively.

On the other hand, when the audio jack 101 is unplugged and leaves the setting position, the first switch SW1 may be cut off. At this time, the second end of the first switch SW1 stops transmitting the bias voltage VMIC to the controller 110. Correspondingly, when the controller 110 stops receiving the bias voltage VMIC transmitted by the first switch SW1, it may be known that the audio jack 101 has been unplugged. In this way, the controller 110 may generate the control signals CTL1 and CTL2 with a second voltage value, and transmit the control signals CTL1 and CTL2 to the audio switches 121 and 122 respectively. The audio switches 121 and 122 may be cut off according to the control signals CTL1 and CTL2 respectively.

The first voltage value is different from the second voltage value. The first voltage value may be a first logical value, and the second voltage value may be a second logical value.

On the other hand, when the audio jack 101 is plugged into the setting position, the controller 110 may transmit a microphone signal MICS to another conductive structure CR3 of the audio jack 101. The microphone signal MICS may be an audio signal sent by a user of the audio device 100 through a microphone.

In light of the above description, in the audio device 100 of the disclosure, through a detection action of the first switch SW1, after the audio jack 101 is disposed at the setting position, the controller 110 receives the corresponding audio signals AS1 and AS2 by turning on the corresponding audio switches 121 and 122. That is to say, during a plug-in process of the audio jack 101, the unstable audio signals AS1 and AS2 will not be transmitted to an inside of the audio device 100 to cause a phenomenon of pop noise. In contrast, when the audio jack 101 is unplugged, the transmission paths of the audio signals AS1 and AS2 may be correspondingly cut off through a cut-off operation of the first switch SW1. That is to say, when the audio jack 101 is unplugged, the unstable audio signals AS1 and AS2 will not be transmitted to the inside of the audio device 100 to cause the phenomenon of pop noise.

Figure 2:
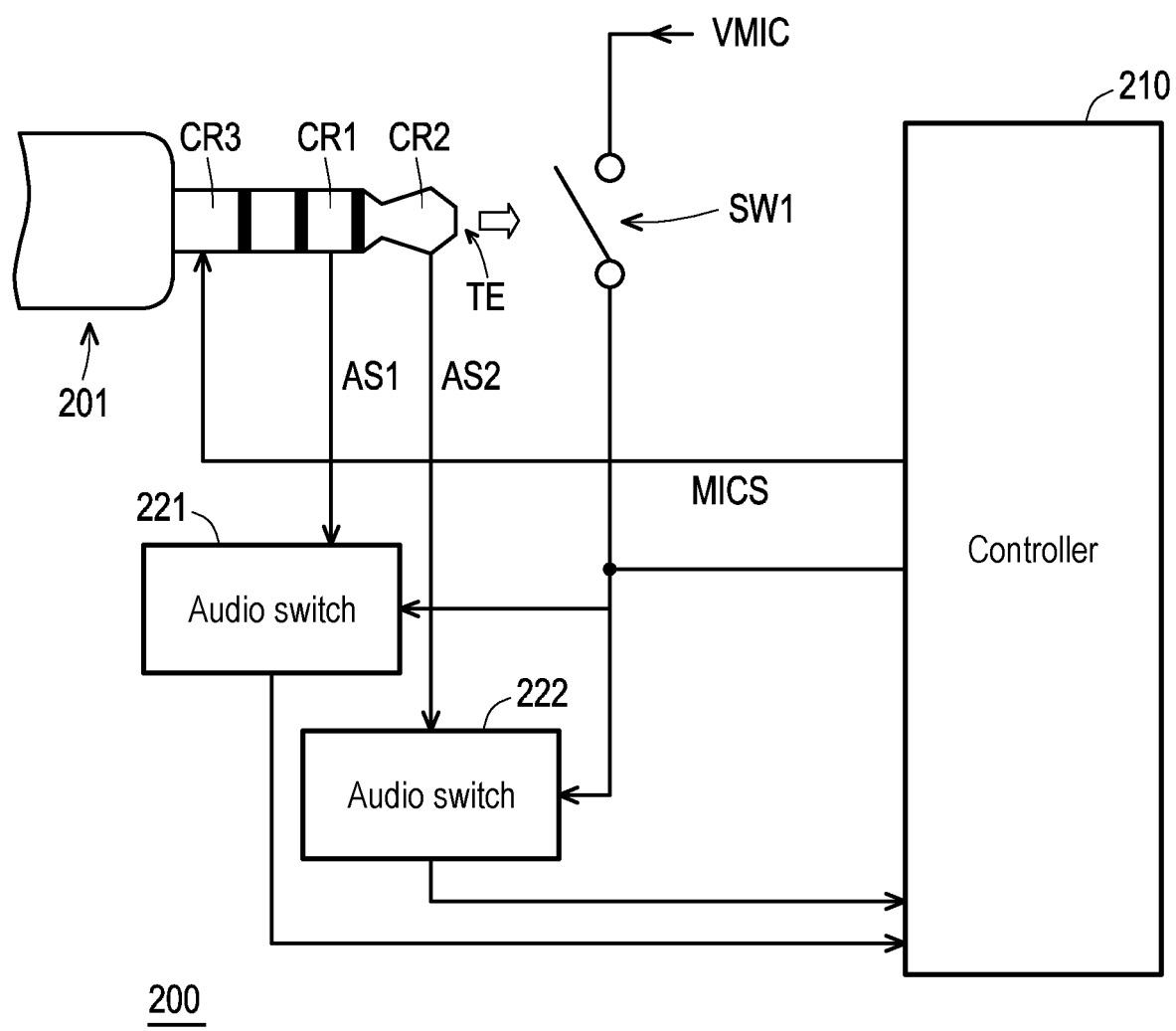
FIG. 2 is a schematic view of an audio device according to another embodiment of the disclosure.

Hereinafter, referring to FIG. 2, FIG. 2 is a schematic view of an audio device according to another embodiment of the disclosure. An audio device 200 includes the first switch SW1, a controller 210, and audio switches 221 and 222. In this embodiment, when an audio jack 201 is plugged into the setting position, the top TE of the audio jack 201 may resist the first switch SW1, so that the first switch SW1 is turned on. Different from the embodiment of FIG. 1, in the embodiment of FIG. 2, the second end of the first switch SW1 may be directly coupled to control ends of the audio switches 221 and 222. When the first switch SW1 is turned on, the bias voltage VMIC may be transmitted to the control ends of the audio switches 221 and 222 through the first switch SW1, so that the audio switches 221 and 222 are turned on. When the audio switches 221 and 222 are turned on, the audio signals AS1 and AS2 transmitted by the conductive structures CR1 and CR2 of the audio jack 201 may be transmitted to the controller 210 and/or the speaker through the audio switches 221 and 222 respectively. The controller 210 may also transmit the microphone signal MICS to the another conductive structure CR3 of the audio jack 201.

On the other hand, when the audio jack 201 is unplugged and separated from the first switch SW1, the first switch SW1 is cut off. The control ends of the audio switches 221 and 222 no longer receive the bias voltage VMIC and transition to the cut-off status. As a result, the audio signals AS1 and AS2 may not be transmitted to the controller 210 and/or the speaker. The controller 210 may also stop the transmission of the microphone signal MICS.

Incidentally, in other embodiments of the disclosure, a pull-down resistor may also be disposed on the second end of first switch SW1. Through the pull-down resistor, when the first switch SW1 is cut off, a voltage on the second end of the first switch SW1 may be quickly pulled down, so that the audio switches 221 and 222 may be cut off immediately.

Figure 3:
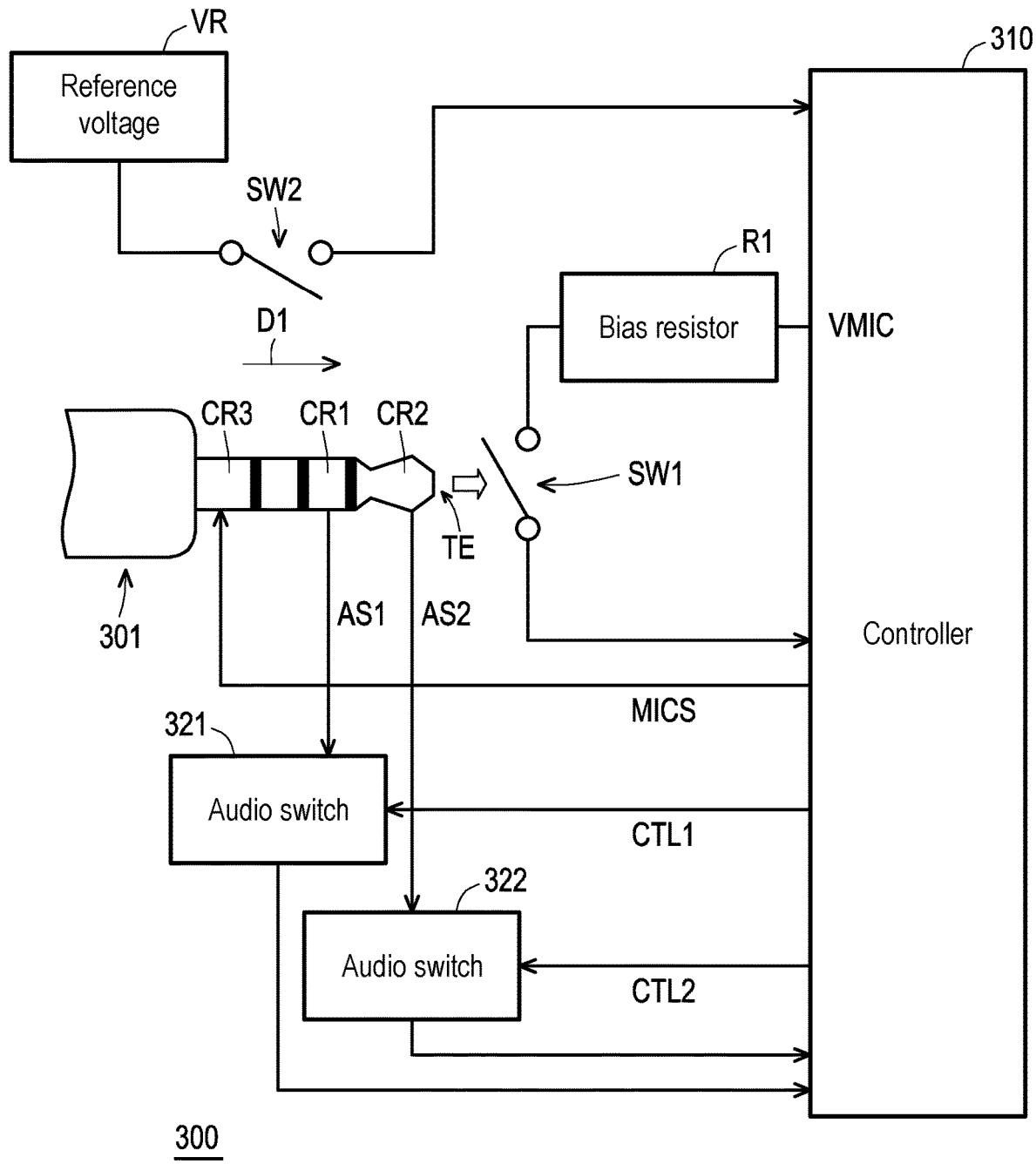
FIG. 3 is a schematic view of an audio device according to another embodiment of the disclosure.

Hereinafter, referring to FIG. 3, FIG. 3 is a schematic view of an audio device according to another embodiment of the disclosure. An audio device 300 includes the first switch SW1, a second switch SW2, a controller 310, audio switches 321 and 322, and bias resistor R1. The first end of the first switch SW1 is coupled to controller 310 through the bias resistor R1, and receives the bias voltage VMIC provided by the controller 310. The second end of the first switch SW1 is coupled to the controller 310. The controller 310 determines the turned-on or cut-off status of the first switch SW1 according to whether the voltage on the second end of the first switch SW1 is the bias voltage VMIC. A first end of the second switch SW2 receives a reference voltage, and a second end of the second switch SW2 is coupled to the controller 310. The second switch SW2 is disposed on a side of a plug-in direction D1 of an audio jack 301. When the audio jack 301 is plugged into the audio device 300, the second switch SW2 may be turned on accordingly. In contrast, when the audio jack 301 is unplugged from the audio device 300 but not plugged into the audio device 300, the second switch SW2 may be cut off accordingly.

In this embodiment, when the audio jack 301 is plugged into the audio device 300, the second switch SW2 may be turned on first. When the second switch SW2 is turned on, the second switch SW2 may transmit a reference voltage VR received on the first end thereof to the controller 310. At this time, the controller 310 may correspondingly generate the bias voltage VMIC. In addition, when the audio jack 301 is plugged into the setting position, the audio jack 301 may resist the first switch SW1, so that the first switch SW1 is turned on. Then, the controller 310 generates the control signals CTL1 and CTL2 accordingly by detecting that the voltage on the second end of the first switch SW1 is equal to the bias voltage VMIC. Further, the controller 310 may transmit the control signals CTL1 and CTL2 to the audio switches 321 and 322 respectively, so that the audio switches 321 and 322 are turned on. When the audio switches 321 and 322 are turned on, the audio jack 301 may provide the audio signals AS1 and AS2 to the controller 310 and/or the speaker. In addition, when the audio switches 321 and 322 are turned on, the controller 310 may provide the microphone signal MICS to the audio jack 301.

Similarly, when the audio jack 301 is unplugged from the audio device 300, the first switch SW1 may be cut off first. Correspondingly, the controller 310 generates the control signals CTL1 and CTL2 corresponding to the voltage on the second end of the first switch SW1 being not equal to the bias voltage VMIC, cuts off the audio switches 321 and 322 through the control signals CTL1 and CTL2, and stops the transmission of the audio signals AS1 and AS2. On the other hand, when the voltage on the second end of the first switch SW1 is not equal to the bias voltage VMIC, the controller 310 may also stop providing the microphone signal MICS to the audio jack 301.

Furthermore, in response to the unplugging operation of the audio jack 301, the second switch SW2 is cut off. In this way, the controller 310 determines that the voltage on the second end of the second switch SW2 is not equal to the reference voltage VR, and may stop generating the bias voltage VMIC, which may save unnecessary power consumption.

It is worth mentioning that the controller 310 in this embodiment may be a processor with computing capabilities. In addition, the controller 310 may be a hardware circuit designed through a hardware description language (HDL) or any other digital circuit design method well known to those skilled in the art, and implemented through a field programmable logic gate array (FPGA), a complex programmable logic device (CPLD), or an application-specific integrated circuit (ASIC).

In addition, the first switch SW1, the second switch SW2, and the audio switches 321 and 322 may be constructed using switch elements that are well known to those skilled in the art without any particular limitations.

Figure 4A:
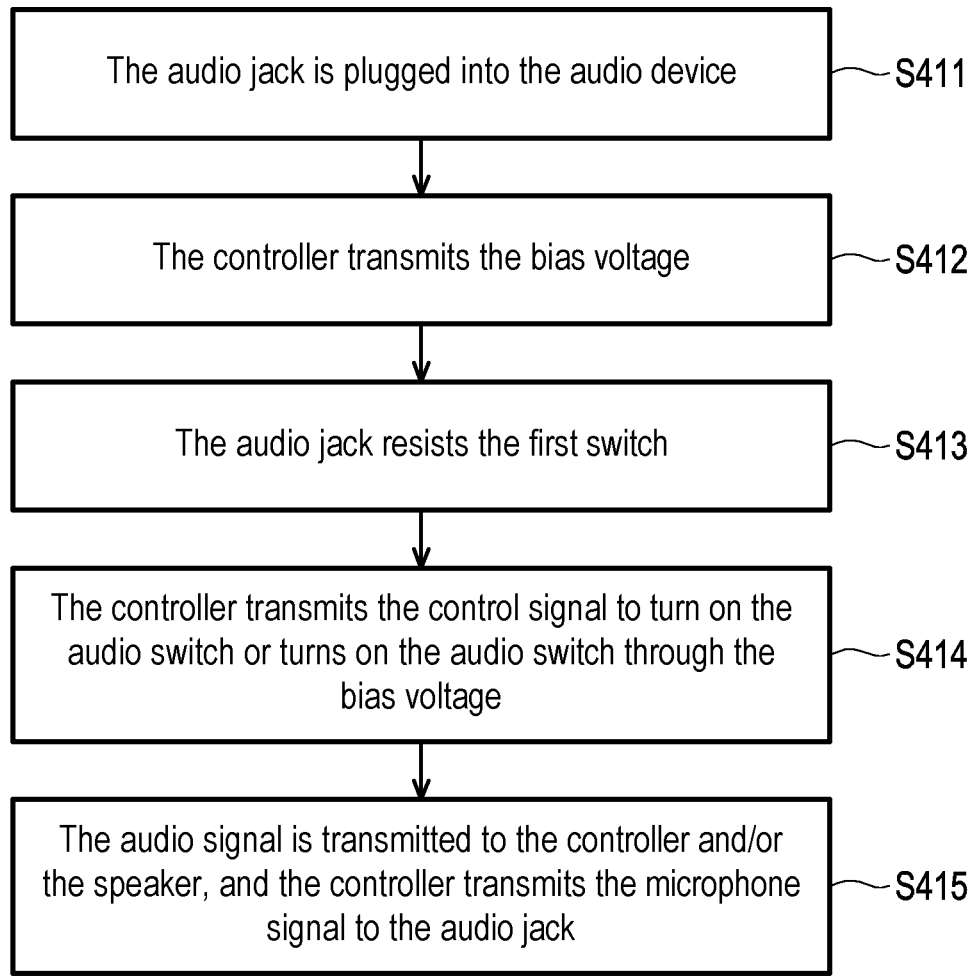
FIGS. 4A and 4B are flowcharts of different implementations of control operations of an audio device respectively according to embodiments of the disclosure.
Figure 4B:
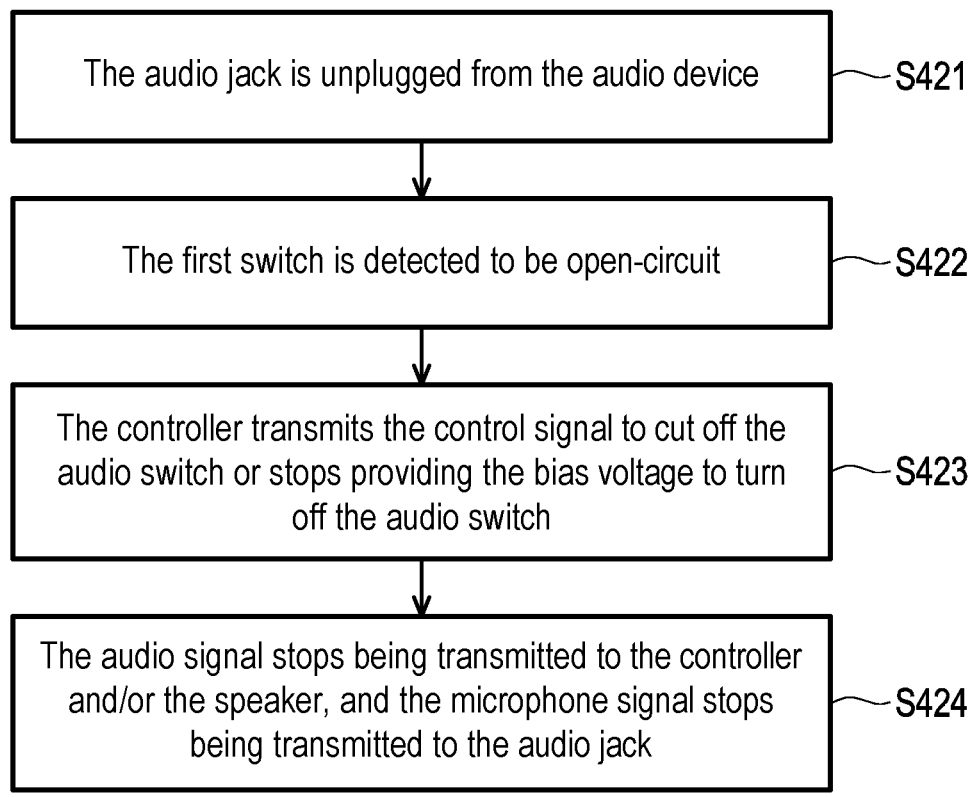

Hereinafter referring to FIGS. 4A and 4B, FIGS. 4A and 4B are flowcharts of different implementations of control operations of an audio device respectively according to embodiments of the disclosure. In FIG. 4A, in step S411, the audio jack is plugged into the audio device. By detecting the plug-in operation of the audio jack, in step S412, the controller may transmit the bias voltage to the first switch. When the audio jack is plugged into the setting position, in step S413, the audio jack resists the first switch and enables the first switch to be turned on. Then, in step S414, the controller may transmit the control signal to turn on the audio switch or transmit the bias voltage to the audio switch to turn on the audio switch in response to the turned-on status of the first switch. In this way, the audio jack may transmit the audio signal to the controller and/or the speaker through the audio switch, and the controller may also transmit the microphone signal to the audio jack (step S415).

In FIG. 4B, in step S421, the audio jack is unplugged from the audio device. In addition, in step S422, the controller may detect that the first switch is open-circuit (cut-off), and in step S423, the controller transmits the control signal to cut off the audio switch or turns off (cuts off) the audio switch by stopping providing the bias voltage. In step S424, based on the audio switch being cut off, the audio signal stops being transmitted to the controller and/or the speaker, and the controller may also stop transmitting the microphone signal to the audio jack.

Figure 5:
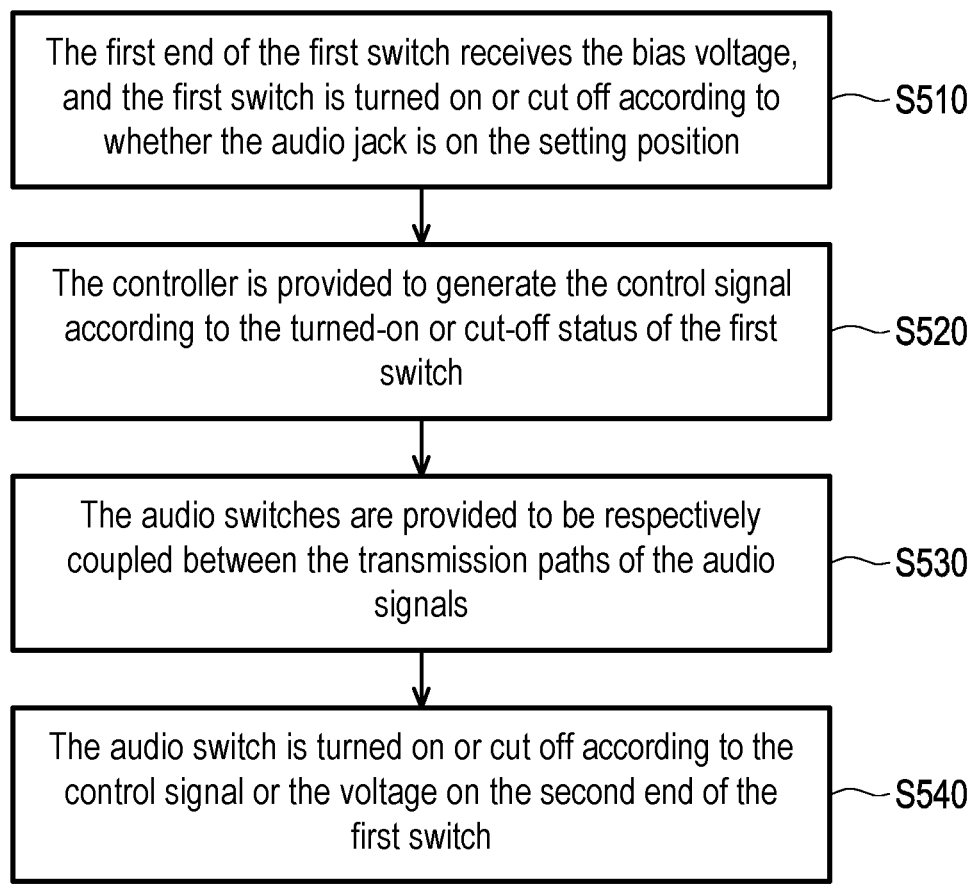
FIG. 5 is a flowchart of a control method of an audio device according to an embodiment of the disclosure.

Referring to FIG. 5, FIG. 5 is a flowchart of a control method of an audio device according to an embodiment of the disclosure. In step S510, the first end of the first switch receives the bias voltage, and the first switch is turned on or cut off according to whether the audio jack is on the setting position. In step S520, the controller is provided to generate the control signal according to the turned-on or cut-off status of the first switch. In step S530, the audio switches are provided to be respectively coupled between the transmission paths of the audio signals. In step S540, the audio switch is turned on or cut off according to the control signal or the voltage on the second end of the first switch.

Implementation details of the above steps S510 to S540 have been described in detail in the previous embodiments. Therefore, the same details will not be repeated in the following.

Based on the above, the audio device in the disclosure detects whether the audio jack has been plugged into the setting position in the audio device by setting first switch. When the audio jack has been plugged into the setting position in the audio device, the audio switch coupled between the transmission paths of the audio signals is turned on to ensure that the transmission operation of the audio signal is performed after the audio jack is stably plugged into the audio device, which may effectively reduce the occurrence of pop noise. In addition, the first switch may also detect that the audio jack has been unplugged from the audio device. In this way, the audio device may cut off the audio switch, which may also reduce the possibility of the occurrence of pop noise when the audio jack is unplugged.

What is claimed is:

1. An audio device, comprising:
a first switch turned on or cut off according to whether an audio jack is on a setting position, wherein a first end of the first switch receives a bias voltage;
a controller coupled to the first switch and generating a control signal according to a turned-on or cut-off status of the first switch;
a plurality of audio switches coupled to the controller, respectively coupled between transmission paths of a plurality of audio signals, and turned on or cut off according to the control signal or a voltage on a second end of the first switch,
wherein when the audio jack is plugged into the setting position, the audio jack resists the first switch and enables the first switch to be turned on,
wherein when the audio switches are turned on, the controller transmits a microphone signal to the audio jack, and receives the audio signals from the audio jack through the audio switches.

2. The audio device according to claim 1, wherein when the audio jack leaves the setting position, the audio jack is separated from the first switch and enables the first switch to be cut off.

3. The audio device according to claim 2, wherein when the controller detects that the voltage on the second end of the first switch is the bias voltage, the control signal is provided to turn on the audio switches.

4. The audio device according to claim 2, wherein when the controller detects that the voltage on the second end of the first switch is not the bias voltage, the control signal is provided to cut off the audio switches.

5. The audio device according to claim 1, wherein the controller generates the control signal according to whether the voltage on the second end of the first switch is the bias voltage.

6. The audio device according to claim 1, wherein when the audio switches are cut off, the controller stops transmitting the microphone signal to the audio jack.

7. The audio device according to claim 1, further comprising:
a second switch having a first end to receive a reference voltage and disposed on a side of a plug-in direction of the audio jack, wherein when the audio jack is plugged into the audio device, the second switch is turned on, and when the audio jack is not plugged into the audio device, the second switch is cut off.

8. The audio device according to claim 1, wherein the controller generates the bias voltage according to whether a voltage on a second end of a second switch is a reference voltage.

9. The audio device according to claim 1, further comprising:

a bias resistor coupled between paths of the first switch receiving the bias voltage.

10. A control method of an audio device, comprising:

enabling a first end of a first switch to receive a bias voltage, and enabling the first switch to be turned on or cut off according to whether an audio jack is on a setting position;

providing a controller to generate a control signal according to a turned-on or cut-off status of the first switch;

providing a plurality of audio switches to be coupled between transmission paths of a plurality of audio signals respectively; and enabling the audio switches to be turned on or cut off according to the control signal or a voltage on a second end of the first switch, wherein when the audio jack is plugged into the setting position, the audio jack resists the first switch and enables the first switch to be turned on, wherein when the audio switches are turned on, transmitting a microphone signal to the audio jack; and receiving the audio signals from the audio jack through the audio switches.

11. The control method according to claim 10, wherein enabling the first switch to be turned on or cut off according to whether the audio jack is on the setting position comprises:

when the audio jack leaves the setting position, enabling the audio jack to be separated from the first switch and enabling the first switch to be cut off.

12. The control method according to claim 10, wherein providing the controller to generate the control signal according to the turned-on or cut-off status of the first switch comprises:

generating the control signal according to whether the voltage on the second end of the first switch is the bias voltage.

13. The control method according to claim 12, further comprising:

when the voltage on the second end of the first switch is the bias voltage, providing the control signal to turn on the audio switches.

14. The control method according to claim 13, further comprising:

when the voltage on the second end of the first switch is not the bias voltage, providing the control signal to cut off the audio switches.

15. The control method according to claim 10, further comprising:

providing a second switch to be disposed on a side of a plug-in direction of the audio jack;

enabling a first end of the second switch to receive a reference voltage;

when the audio jack is plugged into the audio device, enabling the second switch to be turned on; and when the audio jack is not plugged into the audio device, enabling the second switch to be cut off.

16. The control method according to claim 15, further comprising:

enabling the controller to generate the bias voltage according to whether a voltage on a second end of the second switch is a reference voltage.

* * * * *